(12) United States Patent
Cordes et al.

(10) Patent No.: US 11,046,209 B2
(45) Date of Patent: Jun. 29, 2021

(54) PASSENGER SEAT COMPRISING A MANUALLY EXTENSIBLE SEAT ELEMENT, AND PASSENGER CABIN AREA

(71) Applicant: Airbus Operations GmbH, Hamburg (DE)

(72) Inventors: Frank Cordes, Hamburg (DE); Jean-Baptiste Jaffrelot, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 16/495,935

(22) PCT Filed: Mar. 5, 2018

(86) PCT No.: PCT/EP2018/055300
§ 371 (c)(1),
(2) Date: Sep. 20, 2019

(87) PCT Pub. No.: WO2018/172045
PCT Pub. Date: Sep. 27, 2018

(65) Prior Publication Data
US 2020/0130537 A1  Apr. 30, 2020

(30) Foreign Application Priority Data
Mar. 23, 2017 (DE) .......................... 102017204886.7

(51) Int. Cl.
*A47C 7/50* (2006.01)
*B60N 2/02* (2006.01)
(Continued)

(52) U.S. Cl.
CPC .......... *B60N 2/0284* (2013.01); *B60N 2/002* (2013.01); *B64D 11/0639* (2014.12); *B64D 25/00* (2013.01); *B60N 2002/0216* (2013.01)

(58) Field of Classification Search
CPC ... B64D 11/0643; B60N 2/995; B60N 2/0284
See application file for complete search history.

(56) References Cited

U.S. PATENT DOCUMENTS

| | | | | |
|---|---|---|---|---|
| 4,113,311 A | * | 9/1978 | Reida | A47C 7/506 |
| | | | | 297/423.32 |
| D411,922 S | * | 7/1999 | Granados | D6/356 |

(Continued)

FOREIGN PATENT DOCUMENTS

| | | |
|---|---|---|
| DE | 19705477 A1 | 8/1998 |
| DE | 60300365 T2 | 4/2006 |

(Continued)

OTHER PUBLICATIONS

International Search Report; priority document.
German Search Report; priority document.

*Primary Examiner* — Shin H Kim
(74) *Attorney, Agent, or Firm* — Greer, Burns & Crain, Ltd.

(57) ABSTRACT

A passenger seat comprises a backrest and a seat element that includes a first portion adjoining the backrest and a second portion that can pivot between a rest position and an operational position. In the operational position, the second portion of the seat element increases a depth of a seat pan of the seat element that can be used by the user. A locking mechanism is configured to prevent a pivoting movement of the second portion of the seat element from the operational position thereof into the rest position thereof when a weight of a user sitting in the passenger seat acts on the seat element.

15 Claims, 3 Drawing Sheets

(51) Int. Cl.
*B64D 11/06* (2006.01)
*B60N 2/00* (2006.01)
*B64D 25/00* (2006.01)

(56) References Cited

U.S. PATENT DOCUMENTS

| | | | |
|---|---|---|---|
| 7,004,542 B2 | 2/2006 | Saint-Jalmes | |
| 7,083,146 B2 | 8/2006 | Hiesener | |
| 7,458,643 B2 * | 12/2008 | Johnson | B64D 11/0649 |
| | | | 297/411.32 |
| 8,708,417 B2 * | 4/2014 | Mejuhas | B60N 2/62 |
| | | | 297/423.26 |
| 8,931,846 B2 | 1/2015 | Merensky | |
| 9,132,918 B2 * | 9/2015 | Bamford | B64D 11/0643 |
| 9,604,724 B2 * | 3/2017 | Savard | B60N 2/24 |
| 9,650,145 B2 * | 5/2017 | Lambert | B60N 2/0284 |
| 9,987,954 B2 * | 6/2018 | Kimata | B60N 2/0881 |
| 10,132,608 B2 * | 11/2018 | Piaulet | B60N 2/02 |
| 10,336,220 B2 * | 7/2019 | Sera | B60N 2/242 |
| 2005/0062324 A1 | 3/2005 | Shimasaki et al. | |
| 2012/0025019 A1 * | 2/2012 | France | B64D 11/06 |
| | | | 244/118.6 |
| 2013/0234486 A1 | 9/2013 | Duus et al. | |
| 2014/0265511 A1 * | 9/2014 | Marini | B64D 11/0643 |
| | | | 297/423.19 |
| 2014/0265513 A1 * | 9/2014 | Lambert | B60N 2/34 |
| | | | 297/440.1 |
| 2015/0136904 A1 * | 5/2015 | Savard | B60N 2/24 |
| | | | 244/118.6 |
| 2015/0137790 A1 * | 5/2015 | Piaulet | B60N 2/23 |
| | | | 324/71.1 |
| 2015/0284092 A1 * | 10/2015 | Wilkey | B64D 11/0643 |
| | | | 297/423.29 |
| 2016/0031561 A1 * | 2/2016 | Bamford | B64D 11/0644 |
| | | | 297/63 |
| 2016/0167788 A1 * | 6/2016 | Thomaschewski | B60N 2/995 |
| | | | 297/344.1 |
| 2016/0355108 A1 * | 12/2016 | Kimata | B60N 2/12 |
| 2016/0376007 A1 * | 12/2016 | Meindlhumer | B60N 2/3081 |
| | | | 297/14 |
| 2019/0365107 A1 * | 12/2019 | Last | A47C 7/5062 |
| 2020/0108936 A1 * | 4/2020 | Erb | B60N 2/0284 |
| 2020/0216179 A1 * | 7/2020 | Last | B64D 11/0647 |

FOREIGN PATENT DOCUMENTS

| | | |
|---|---|---|
| DE | 102007047651 B3 | 2/2009 |
| DE | 102010046853 A1 | 3/2012 |
| EP | 1452444 B1 | 9/2004 |
| GB | 2449451 A1 | 11/2008 |
| JP | H06319628 A | 11/1994 |
| WO | 2010086785 A1 | 8/2010 |

* cited by examiner

PASSENGER SEAT COMPRISING A MANUALLY EXTENSIBLE SEAT ELEMENT, AND PASSENGER CABIN AREA

CROSS-REFERENCES TO RELATED APPLICATIONS

This application claims the benefit of the International Application No. PCT/EP2018/055300, filed on Mar. 5, 2018, and of the German patent application No. 10 2017 204 886.7 filed on Mar. 23, 2017, the entire disclosures of which are incorporated herein by way of reference.

FIELD OF THE INVENTION

The invention relates to a passenger seat which is suitable for use in the passenger cabin of an aircraft, but also for use in other means of transport, such as, for example, buses or trains. The invention relates further to a passenger cabin area equipped with such a passenger seat.

BACKGROUND OF THE INVENTION

In modern means of transport, in particular in aircraft, it is very important economically to make optimal use of the space available in a passenger cabin. Therefore, in particular in the economy class of an aircraft passenger cabin, rows of seats arranged one behind the other are positioned at as small a distance as possible from one another. However, in areas of an aircraft passenger cabin that are adjacent to emergency exits, it is necessary to provide transverse aisles between rows of seats arranged one behind the other, which transverse aisles connect a main aisle extending along a longitudinal axis of the aircraft passenger cabin with the emergency exits located, for example, above the wings. In order to permit a rapid passenger flow to the emergency exits in the event of an emergency evacuation, the transverse aisles must have a prescribed width of, for example, 13 inches. Accordingly, rows of seats adjoining the transverse aisles must be arranged at a relatively large distance from one another.

EP 1 452 444 B1, or U.S. Pat. No. 7,083,146 B1, describes an arrangement of rows of seats for a passenger cabin of a commercial aircraft comprising rows of seats arranged one behind the other, wherein the rows of seats are arranged with a predetermined seat pitch. In the region of exits, a transverse aisle formed by an increased seat pitch of the rows of seats is provided as access to the exits. At least one row of seats adjoining the transverse aisle is equipped with passenger seats having a foldable seat part, so that the width of the transverse aisle can be changed to a greater width by tilting up the corresponding seat part.

SUMMARY OF THE INVENTION

An object underlying the invention is to provide a passenger seat which, while complying with all safety requirements for dimensions of emergency exit aisles, permits optimal use of the space available in the passenger cabin of an aircraft or other means of transport. A further object underlying the invention is to provide a passenger cabin area equipped with such a passenger seat.

A passenger seat comprises a backrest and a seat element. The backrest is preferably pivotable relative to the seat element between an upright position, in which a backrest surface of the backrest extends substantially perpendicular to a seat surface of the seat element, and a reclined position, in which the backrest surface of the backrest forms an angle greater than 90° with the seat surface of the seat element. The expression "seat surface" here denotes a surface of the seat element facing the backrest, on which a user of the passenger seat can sit in the conventional manner. The expression "backrest surface" here denotes a front surface of the backrest, against which a user of the passenger seat can lean in the conventional manner when he is seated on the seat surface of the seat element.

The seat element of the passenger seat comprises a first portion adjoining the backrest and a second portion which is pivotable relative to the first portion between a rest position and a use position. In its use position, the second portion of the seat element increases a depth of a seat surface of the seat element that can be used by the user. The term "depth" is here understood as meaning a dimension of the seat surface from a rear edge of the seat element facing the backrest to a front edge of the seat element remote from the backrest. When the second portion of the seat element is in its rest position, the seat element has a smaller depth and consequently a smaller space requirement than in an operational state of the passenger seat in which the second portion of the seat element is in its use position. In its use position, on the other hand, the second portion of the seat element ensures that the user can sit comfortably on the seat element, that is to say, on the seat surface of the seat element.

When the passenger seat is installed in a passenger cabin of a means of transport, for example of an aircraft, the seat element in an operational state of the passenger seat in which the second portion of the seat element is in its rest position is thus at a greater distance from a front seat located in front of the passenger seat than in an operational state of the passenger seat in which the second portion of the seat element is in its use position. The passenger seat can therefore advantageously be installed in a passenger cabin of a means of transport adjoining a transverse aisle which provides access to further passenger seats arranged at the side of the passenger seat or to an exit, in particular an emergency exit of the passenger cabin. In particular, the passenger seat can be arranged adjoining the transverse aisle in such a manner that the seat element of the passenger seat is facing the transverse aisle.

In normal operation of the means of transport, the passenger seat can then be used with the second portion of the seat element in its use position in the conventional manner and without any loss of comfort for a passenger seated on the passenger seat. If, on the other hand, passengers need to reach the passenger seats arranged at the side of the passenger seat or the exit through the transverse aisle, the second portion of the seat element can be brought into its rest position. As a result, the transverse aisle is made wider, so that passage through the transverse aisle is made significantly easier and consequently faster. The passenger seat thus permits optimal use of the space available in the passenger cabin. At the same time, all the safety requirements for dimensions of aisles to exits, in particular emergency exits, can be complied with. Particularly advantageously, the passenger seat can be used in an aircraft passenger cabin adjacent to an emergency exit located above a wing, in order to ensure a prescribed transverse aisle width of 13 inches.

Finally, the passenger seat comprises a locking mechanism which is adapted to prevent a pivoting movement of the second portion of the seat element from its use position into its rest position when a weight force of a user seated on the passenger seat is acting on the seat element. By means of the locking mechanism, the second portion of the seat element is prevented from moving in an undesirable manner from its use position into its rest position when a user is seated on the passenger seat. Coupling the activation of the locking mechanism with the weight force applied to the seat element by a user seated on the passenger seat means that the user does not have to actively actuate the locking mechanism and thus increases the convenience for the user.

The locking mechanism is preferably further adapted to release the second portion of the seat element for a pivoting movement from its use position into its rest position when the weight force acting on the seat element is removed. Such a configuration of the locking mechanism ensures that the second portion of the seat element can be moved from its use position back into its rest position, and consequently the space requirement of the seat element can be reduced again, as soon as the passenger seat is no longer in use, that is to say, as soon as a user seated on the passenger seat stands up from the seat, without the locking mechanism having to be actively unlocked for that purpose.

In a preferred form of the passenger seat, the second portion of the seat element is pivotable about a pivot axis between its rest position and its use position. The pivot axis is preferably arranged in the region of a front edge, remote from the backrest, of the first portion of the seat element. When the second portion of the seat element is in its rest position, a lower side of the second portion of the seat element that is remote from a seat surface portion of the second portion of the seat element forms, in particular, an angle of from 45 to 135°, preferably an angle of from 70 to 110°, particularly preferably an angle of from 80 to 100°, and most particularly preferably an angle of approximately 90°, with a lower side of the first portion of the seat element that is remote from a seat surface portion of the first portion of the seat element. In other words, in its rest position, the second portion of the seat element is preferably pivoted downwards relative to the first portion of the seat element.

When the second portion of the seat element is in its use position, on the other hand, the seat surface portion of the second portion of the seat element forms preferably an angle of from 170 to 225°, preferably an angle of from 175 to 205°, and particularly preferably an angle of approximately 180°, with the seat surface portion of the first portion of the seat element. In other words, in its use position, the second portion of the seat element is so arranged relative to the first portion of the seat element that the seat surface portions of the first and second portions of the seat element are substantially in alignment with one another.

The second portion of the seat element is preferably pivotable from its rest position into its use position by manual actuation. This makes it possible to dispense with mechanical or electrical actuating devices and thus permits a construction of the passenger seat which is simple and thus less susceptible to faults.

The passenger seat preferably further comprises a biasing mechanism which is adapted to bias the second portion of the seat element into its rest position. Additional manual alteration measures for moving the second portion of the seat element from its use position back into its rest position can thus be omitted, so that the passenger seat can be brought particularly quickly and simply into an operational state in which the seat element has a reduced space requirement and thus creates additional free space, for example in a transverse aisle adjoining the passenger seat. If desired, the biasing mechanism can be integrated with the locking mechanism.

The locking mechanism of the passenger seat preferably comprises a holding element connected to the second portion of the seat element. The holding element can be movable between a holding position and a release position. When the holding element is arranged in its holding position, the holding element preferably holds the second portion of the seat element in its use position. When it is arranged in its release position, the holding element preferably permits a pivoting movement of the second portion of the seat element from its use position into its rest position. In order to lock the second portion of the seat element in its use position, the holding element can preferably be blocked, or locked, in its holding position.

The holding element can be in the form of a piston which is connected to the second portion of the seat element and is displaceable in a cylinder between its holding position and its release position. In particular, a free end of a piston rod of the piston can be connected to the second portion of the seat element. The cylinder can be in the form of a hydraulic or pneumatic cylinder, for example, and can comprise a fluid chamber delimited by a piston surface of the piston and containing a hydraulic or pneumatic fluid. As long as fluid is able to flow unhindered into the fluid chamber and out of the fluid chamber, the piston is freely displaceable in the cylinder. Accordingly, the second portion of the seat element is then also freely movable between its rest position and its use position.

For example, the fluid chamber can be connected by at least one hydraulic or pneumatic line to a region of the cylinder that is remote from the piston surface of the piston. As long as fluid is able to flow unhindered through that line, the piston is then freely displaceable in the cylinder and the second portion of the seat element is freely movable between its rest position and its use position. If, on the other hand, fluid is prevented from flowing out of the fluid chamber, the piston is no longer displaceable in the cylinder in the direction of the fluid chamber. A holding element in the form of a piston of a piston/cylinder arrangement can thereby lock the second portion of the seat element in its use position.

The locking mechanism can further comprise a first valve which is adjustable between an open position, in which the first valve allows the holding element to move from its holding position into its release position, and a closed position, in which the first valve prevents the holding element from moving from its holding position into its release position. Preferably, the first valve is arranged in a first hydraulic or pneumatic line which connects the fluid chamber of the cylinder to a region of the cylinder that is remote from the piston surface of the piston. By closing the first valve, fluid can be prevented from flowing through the first line, so that a displacement of a holding element in the form of a piston of a piston/cylinder arrangement in the direction towards the fluid chamber is no longer possible, that is to say, a movement of the holding element from its holding position into its release position is prevented.

The first valve is preferably biased into its open position. Furthermore, the first valve can be equipped with an actuating element which is adapted to be activated by the action on the seat element of a weight force of a user seated on the passenger seat, in order to move the first valve into its closed position. The actuating element is preferably biased into a non-activated state. It is thereby ensured that the first valve remains in its open position as long as no weight force is acting on the seat element, that is to say a user is not seated on the passenger seat. If, on the other hand, the actuating element is activated against the biasing force acting on the actuating element by the weight force of a user seated on the passenger seat, the first valve is moved into its closed position without further manual actuation on the part of the user being required.

In order to allow the weight force of a user seated on the passenger seat to be converted into an activation of the actuating element and consequently a movement of the first valve into its closed position, the actuating element can be connected, for example, to a seat element carrier which carries the seat element and is consequently loaded with a weight force acting on the seat element, and/or to the seat element itself. The seat element can be fastened, for example, to a sub-structure, which can in turn be fastened in a seat rail provided in a floor of a passenger cabin of a means of transport. In particular, the actuating element can be in the form of an actuating pin which is pushed into its activated position as soon as the seat element is loaded with the weight force of a user of the passenger seat.

The locking mechanism can further comprise a non-return valve, which allows the holding element to move from its release position into its holding position but prevents the holding element from moving from its holding position into its release position. The non-return valve can be arranged, for example, in a second hydraulic or pneumatic line running parallel to the first hydraulic or pneumatic line and can be adapted to allow fluid to flow from a region of the cylinder that is remote from the piston surface of a holding element in the form of a piston into the fluid chamber formed in the cylinder, but to prevent fluid from flowing out of the fluid chamber into the region of the cylinder that is remote from the piston surface.

In the case of such a form of the locking mechanism, a displacement of the piston in the cylinder towards the fluid chamber is still possible even if a weight force of a user seated on the passenger seat is acting on the seat element and consequently the first valve arranged in the first hydraulic or pneumatic line is closed. The second portion of the seat element can accordingly be pivoted by the already seated user from its rest position into its use position, but a return movement of the second portion of the seat element from its use position into its rest position is no longer possible because the non-return valve prevents fluid from flowing back out of the fluid chamber into the region of the cylinder that is remote from the piston surface.

In a preferred embodiment, the passenger seat further comprises an unlocking mechanism which is adapted to permit a pivoting movement of the second portion of the seat element from its use position into its rest position even though a weight force of a user seated on the passenger seat is acting on the seat element. The unlocking mechanism allows a user seated on the passenger seat to pivot the second portion of the seat element from its use position in the direction towards its rest position or fully into its rest position. The user is thus able, for example, to correct a position of the second portion of the seat element which was set by him but is becoming uncomfortable, without standing up from the passenger seat. This increases the comfort of the user.

Preferably, the unlocking mechanism comprises a manually operable activating switch. Furthermore, the unlocking mechanism is preferably adapted to permit a pivoting movement of the second portion of the seat element from its use position into its rest position only when the activating switch is operated. By equipping the unlocking mechanism with an activating switch the unlocking mechanism is configured so that it unlocks the second portion of the seat element only when the activating switch is operated.

The activating switch is preferably biased into a non-activated position, for example by means of a spring, in order to ensure that the activating switch has to be actively manually operated by a user of the passenger seat in order to activate the unlocking mechanism. The activating switch can be arranged in the region of an armrest of the passenger seat. The activating switch is then easily and conveniently accessible for a user of the passenger seat.

The unlocking mechanism can comprise a second valve which is adjustable between a closed position, in which the second valve prevents the holding element from moving from its holding position into its release position, and an open position, in which the second valve allows the holding element to move from its holding position into its release position. Preferably, the second valve is arranged in a third hydraulic or pneumatic line which connects the fluid chamber of the cylinder to a region of the cylinder that is remote from the piston surface of the piston. The third hydraulic or pneumatic line can run parallel to the first and/or the second hydraulic or pneumatic line. Furthermore, the second valve is preferably biased into its closed position.

By opening the second valve, fluid is allowed to flow through the third line, so that the holding element in the form of a piston can move in the cylinder in the direction towards the fluid chamber, even if the flow of fluid through the first line is prevented by the closed first valve and the flow of fluid through the second line is prevented by the non-return valve. Consequently, a pivoting movement of the second portion of the seat element from its use position in the direction towards its rest position is made possible by a user seated on the passenger seat.

The activating switch of the unlocking element is preferably adapted to move the second valve into its open position. For example, the activating switch can be in the form of an activating pin or other suitable mechanical activating mechanism, such as, for example, a cable mechanism or the like, which can manually be brought into its activated position by a user of the passenger seat if activation of the unlocking mechanism is desired on the part of the user.

A flow cross-section of the first valve and/or of the non-return valve is preferably larger than a flow cross-section of the second valve. Furthermore, a flow cross-section of a first line, in which the first valve is arranged, and/or a flow cross-section of a second line, in which the non-return valve is arranged, can be larger than a flow cross-section of a third line in which the second valve is arranged. If the first valve, the non-return valve, the first line and the second line have a large flow cross-section, the second portion of the seat element is able to move freely from its rest position into its use position by manual actuation by the user of the passenger seat. This facilitates the operation of the passenger seat.

By contrast, a smaller flow cross-section of the second valve and of the third line ensures that, although the manual movement of the second portion of the seat element from its use position into its rest position is less free than the manual movement of the second portion of the seat element from its rest position into its use position, the movement is better controllable by a user of the passenger seat. Accordingly, a fine adjustment of the position of the second portion of the seat element is possible.

Instead of the hydraulic or pneumatic system with a piston/cylinder arrangement described herein, the passenger seat can also have a mechanically or electrically implemented locking mechanism and/or unlocking mechanism.

A passenger cabin area comprises a main aisle which extends substantially parallel to a longitudinal axis of the passenger cabin area. The passenger cabin area further comprises an exit and also a transverse aisle branching from the main aisle. At least one passenger seat as described above is arranged in the passenger cabin area adjoining the transverse aisle in such a manner that the seat element of the passenger seat is facing the transverse aisle. In such a passenger cabin area, the transverse aisle can be made wider by deactivating the enlargement mechanism so that the depth of the seat surface of the passenger seat that is usable by the user corresponds only to the rest position depth.

The transverse aisle can be a transverse aisle running between rows of passenger seats arranged one behind the other. The passenger seat can then advantageously be installed in the passenger cabin area, for example, as an "aisle seat" positioned adjacent to the main aisle, in order to facilitate access via the transverse aisle to passenger seats installed at the side of the passenger seat as a "middle seat" and/or "window seat". In a particularly preferred embodiment of the passenger cabin area, the transverse aisle connects the main aisle with an exit, in particular an emergency exit of the passenger cabin area.

The above-described passenger seat and/or the above-described passenger cabin area is/are suitable, in particular, for use in an aircraft. The passenger cabin area can, in particular, be an aircraft passenger cabin area having a transverse aisle which connects the main aisle with an emergency exit located above a wing and in which a predefined transverse aisle width of 13 inches is to be ensured.

BRIEF DESCRIPTION OF THE DRAWINGS

Preferred embodiments of the invention will now be described in greater detail with reference to the accompanying schematic drawings, in which.

DETAILED DESCRIPTION OF THE PREFERRED EMBODIMENTS

Figure 1:
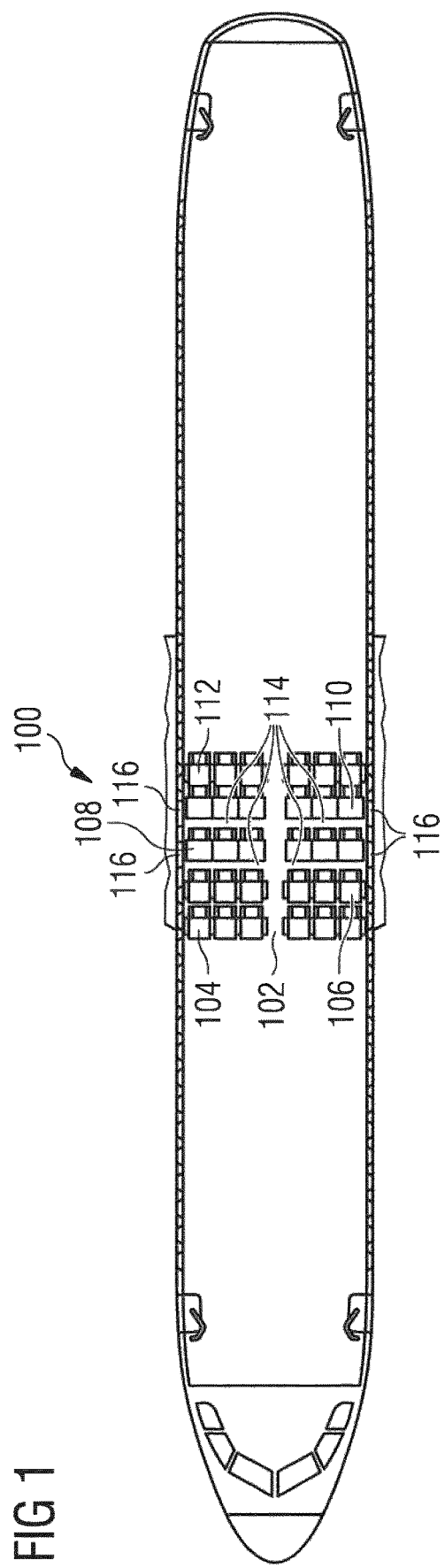
FIG. 1 shows a passenger cabin area in which a plurality of passenger seats is arranged.

FIG. 1 shows a passenger cabin area 100, which in the exemplary embodiment shown here forms part of an aircraft passenger cabin. The passenger cabin area 100 comprises a main aisle 102 which extends substantially parallel to a longitudinal axis L of the passenger cabin area 100. In the passenger cabin area 100 there are installed a plurality of rows of passenger seats 104, 106, 108, 110, 112. Between the rows of passenger seats 106 and 108 and the rows of passenger seats 108 and 110 there are provided in each case transverse aisles 114, which connect the main aisle 102 with emergency exits 116. In the exemplary embodiment of an aircraft passenger cabin area 100 shown in FIG. 1, the emergency exits 116 are positioned over the wings of the aircraft.

The transverse aisles 114 must have a prescribed width in order to be able to ensure a sufficient passenger flow through the transverse aisles 114 to the emergency exits 116 in the event of an emergency evacuation of the aircraft passenger cabin. In the arrangement according to FIG. 1, the distance between passenger seats arranged one behind the other of the rows of passenger seats 106 and 108 and also between passenger seats arranged one behind the other of the rows of passenger seats 108 and 110 is for this reason, in each case, greater than the distance between passenger seats arranged one behind the other of the rows of passenger seats 104 and 106 and between passenger seats arranged one behind the other of the rows of passenger seats 110 and 112.

Figure 2:
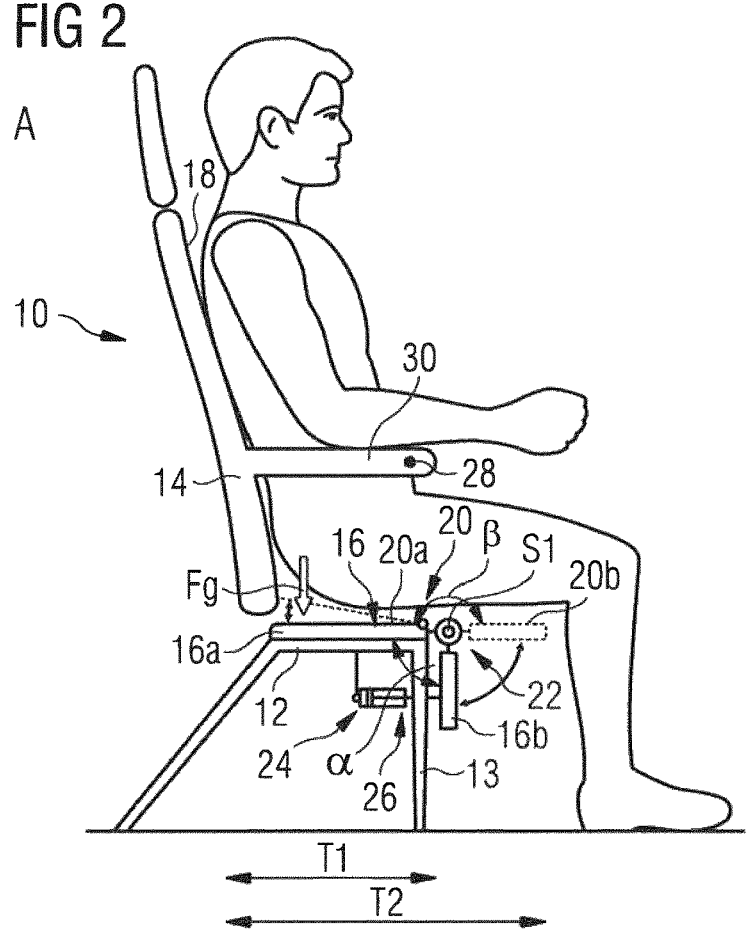
FIG. 2 is a side view of a passenger seat suitable for installation in the passenger cabin area according to FIG. 1, having a seat element which comprises a first portion and a second portion which is pivotable relative to the first portion between a rest position and a use position.
Figure 3:
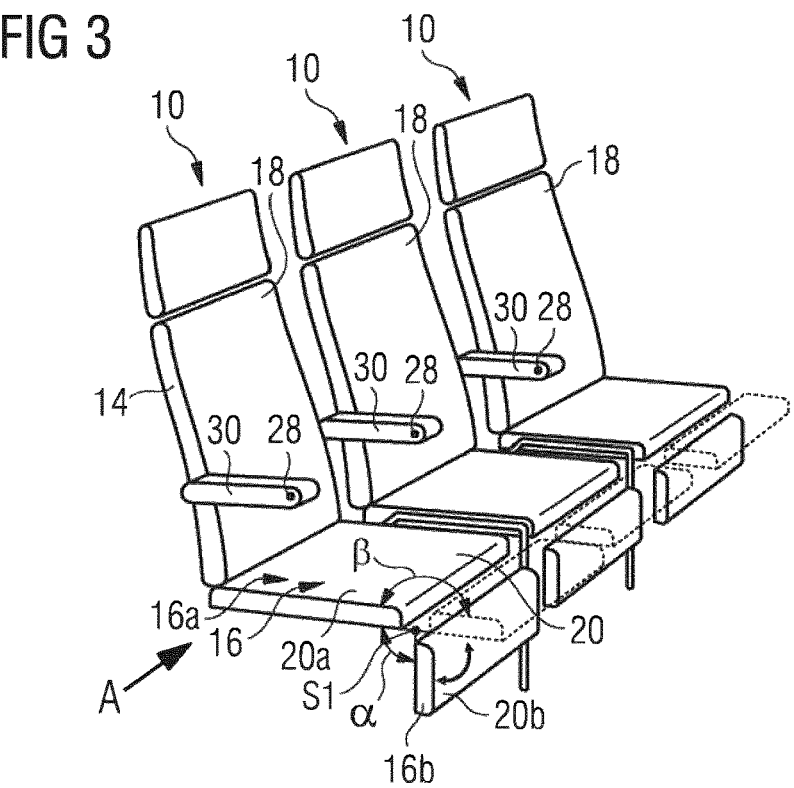
FIG. 3 shows a row of passenger seats with three passenger seats according to FIG. 2 arranged next to one another.

Passenger seats 10 suitable for installation in the rows of passenger seats 106 and 108 of the passenger cabin area 100 shown in FIG. 1 are illustrated in FIGS. 2 and 3. In addition or alternatively, the passenger seats 10 shown in FIGS. 2 and 3 are also suitable for installation in the rows of passenger seats 104, 110 and 112 as "aisle seats" adjacent to the main aisle 102 and/or as "middle seats" in order to facilitate access to the "window seats", as will be explained in greater detail hereinbelow.

The passenger seat 10 comprises a seat element carrier 12, which is fastened to a seat sub-structure 13 which is not shown in the figures. The seat sub-structure 13 can, in turn, be fastened in a seat rail, which can be integrated in a floor of the passenger cabin area 100. The passenger seat 10 further comprises a backrest 14 and also a seat element 16. The backrest 14 is pivotable relative to the seat element 16 between an upright position and a reclined position. When the backrest 14 is in its upright position, a backrest surface 18 of the backrest 14 extends substantially perpendicular to a seat surface 20 of the seat element 16. By contrast, the backrest surface 18 of the backrest 14 forms an angle greater than 90° with the seat surface 20 of the seat element 16 when the backrest 14 is in its reclined position. If desired, the backrest 14 can, however, also be designed to be rigid, that is to say not pivotable relative to the seat element 16.

The seat element 16 of the passenger seat 10 comprises a first portion 16a adjoining the backrest 14 and a second portion 16b which is pivotable relative to the first portion 16a about a pivot axis S1 which is arranged in the region of a front edge, remote from the backrest 14, of the first portion 16a of the seat element 16, between a rest position (illustrated in FIGS. 2 and 3 by solid lines) and a use position (illustrated in FIGS. 2 and 3 by broken lines). In the exemplary embodiment of a passenger seat 10 shown in the figures, when the second portion 16b of the seat element 16 is in its rest position illustrated in FIGS. 2 and 3 by the solid lines, a lower side of the second portion 16b of the seat element 16 that is remote from a seat surface portion 20b of the second portion 16b of the seat element 16 forms an angle α of approximately 90° with a lower side of the first portion 16a of the seat element 16 that is remote from a seat surface portion 20a of the first portion 16a of the seat element 16.

By contrast, when the second portion 16b of the seat element 16 is in its use position illustrated in FIGS. 2 and 3 by the broken lines, the seat surface portion 20b of the second portion 16b of the seat element 16 forms an angle β of approximately 180° with the seat surface portion 20a of the first portion 16a of the seat element 16. In other words, in the use position of the second portion 16b of the seat element 16, the seat surface portion 20b of the second portion 16b of the seat element 16 is in alignment with the seat surface portion 20a of the first portion 16a, so that the second portion 16b of the seat element 16 increases a depth T of a seat surface 20 of the seat element 16 that is usable by the user from a depth T1 to a depth T2.

A biasing mechanism 22, which can comprise, for example, a spring provided in the region of the pivot axis S1, biases the second portion 16b of the seat element 16 into its rest position. However, the second portion 16b of the seat element 16 can be pivoted from its rest position into its use position by manual actuation by a user of the passenger seat 10 against the biasing force applied by the biasing mechanism 22 to the second portion 16b of the seat element 16.

In addition, the passenger seat 10 comprises a locking mechanism 24 which prevents a pivoting movement of the second portion 16b of the seat element 16 from its use position into its rest position when a weight force FG of a user seated on the passenger seat is acting on the seat element 16. Furthermore, the locking mechanism 24 is adapted to release the second portion 16b of the seat element 16 for a pivoting movement about the pivot axis S1 from its use position into its rest position when the weight force FG acting on the seat element 16 is removed.

Finally, the passenger seat 10 comprises an unlocking mechanism 26 which permits a pivoting movement of the second portion 16b of the seat element 16 about the pivot axis S1 from its use position into its rest position even though a weight force FG of a user seated on the passenger seat 10 is acting on the seat element 16. The unlocking mechanism 26 comprises a manually operable activating switch 28 which is arranged in the region of an armrest 30 of the passenger seat. The unlocking mechanism 26 is in particular in such a form that it permits a pivoting movement of the second portion 16b of the seat element 16 about the pivot axis S1 from its use position into its rest position only if, that is to say as long as the activating switch 28 is operated. The activating switch 28 is biased, for example by means of a spring (not shown in the figures), into a non-activated position, in order to ensure that the activating switch 28 must be actively manually operated by a user of the passenger seat 10 in order to activate the unlocking mechanism 26.

In the following, the function of the passenger seat 10 will be described. When the passenger seat 10 is not in use, the second portion 16b of the seat element 16 is in its rest position in which the seat surface 20 of the seat element 16 has only the reduced depth T1. Accordingly, the seat element 16 has a small space requirement forwards in a direction perpendicular to the backrest surface 18 of the backrest 14, so that, when the passenger seat 10 is in the unused state, the distance between the front edge of the seat element 16 and a front seat located in front of the passenger seat 10 can be increased. The second portion 16b of the seat element 16 is held in its rest position by the biasing mechanism 22, so that an unintentional movement of the second portion 16b of the seat element 16 from its rest position into its use position is prevented.

When a user wishes to sit on the passenger seat 10, he sits on the seat element 16 and folds the second portion 16b of the seat element 16 manually upwards into its use position, until the seat surface portion 20b of the second portion 16b of the seat element 16 is in alignment with the seat surface portion 20a of the first portion 16a of the seat element 16. The depth of the total seat surface 20 of the seat element 16 is thereby increased to the depth T2, which permits comfortable seating. As long as the user is sitting on the passenger seat 10 and the weight force FG of the user is acting on the seat element 16, the locking mechanism 24 prevents the second portion 16b of the seat element 16 from moving from its use position into its rest position. Active actuation of the locking mechanism 24 by the user is not required therefor.

If the user of the passenger seat 10 wishes to change the position of the second portion 16b of the seat element 16, that is to say, wishes to move the second portion 16b of the seat element 16 from its use position in the direction towards its rest position, for example in order to correct a position of the second portion 16b of the seat element 16 which was set by him but which is becoming uncomfortable, he can operate the activating switch 28 arranged in the region of the armrest 30. The unlocking mechanism 26 is thereby activated, which allows the user seated on the passenger seat 10 to pivot the second portion 16b of the seat element 16 from its use position in the direction towards its rest position or fully into its rest position without standing up from the passenger seat 10. However, as soon as the user lets go of the activating switch 28, the unlocking mechanism 26 is deactivated again, so that unintentional unlocking of the second portion 16b of the seat element 16 is prevented.

When the user finally stands up from the passenger seat 10 and consequently the weight force FG is no longer acting on the seat element 16, the locking mechanism 24 is unlocked automatically without requiring an active action on the part of the user. The biasing mechanism 22 then ensures that the second portion 16b of the seat element 16 is automatically pivoted back into its rest position.

If the passenger seat 10 is installed in the passenger cabin area 100 in the rows of passenger seats 106 and 108 adjoining the transverse aisles 114 in such a manner that the seat element 16 of the passenger seat 10 is facing the transverse aisle 114 in question, it is possible by pivoting the second portion 16b of the seat element 16 from its use position into its rest position to increase the distance between the front edge of the seat element 16 and a further passenger seat located in front of the passenger seat 10. In normal operation of an aircraft equipped with the passenger cabin area 100, the passenger seat 10 can be used with the second portion 16b of the seat element 16 arranged in its use position in the conventional manner and without losses of comfort for a passenger seated on the passenger seat 10. If, on the other hand, passengers need to pass through transverse aisle 114 to the exit 116, the second portion 16b can be pivoted into its rest position, whereby the transverse aisle 114 can be made wider.

The construction and functioning of the locking mechanism 24 and of the unlocking mechanism 26 will now be explained in greater detail with reference to FIGS. 4 to 6. In particular, the locking mechanism 24 comprises a holding element 32 which is connected to the second portion 16b of the seat element 16. The holding element 32 is movable between a holding position and a release position. When the holding element 32 is arranged in its holding position, the holding element 32 holds the second portion 16b of the seat element 16 in its use position. When it is arranged in its release position, on the other hand, the holding element 32 permits a pivoting movement of the second portion 16b of the seat element 16 about the pivot axis S1 from its use position into its rest position. In order to lock the second portion 16b of the seat element 16 in its use position, the holding element 32 can be blocked, or locked, in its holding position.

Figure 4:
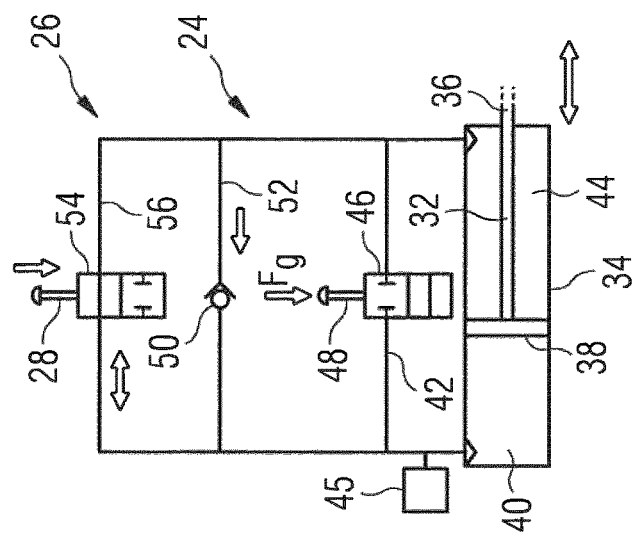
FIG. 4 shows by way of example a hydraulic system which forms a locking mechanism and also an unlocking mechanism of the passenger seat according to FIG. 2, wherein the locking mechanism and the unlocking mechanism are deactivated.
Figure 5:
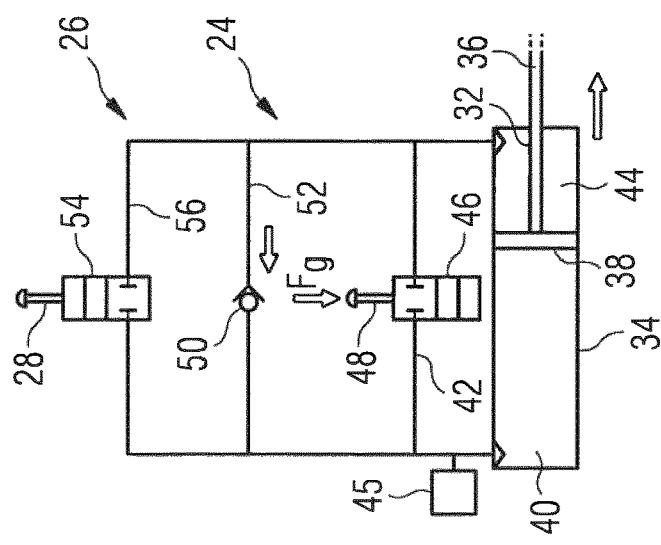
FIG. 5 shows the hydraulic system according to FIG. 4, wherein the locking mechanism is activated and the unlocking mechanism is deactivated.
Figure 6:
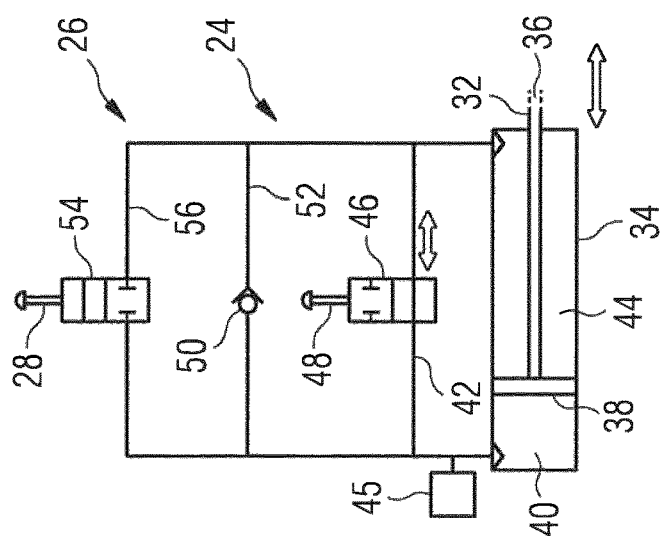
FIG. 6 shows the hydraulic system according to FIG. 4, wherein the locking mechanism and the unlocking mechanism are activated.

In FIGS. 4 to 6, a configuration of the locking mechanism 24 and of the unlocking mechanism 26 in the form of a hydraulic system is illustrated. Alternatively, the locking mechanism 24 and the unlocking mechanism 26 can, however, also be implemented in the form of a pneumatic system, in the form of a mechanical system or in the form of an electrically driven system.

In the system illustrated in FIGS. 4 to 6, the holding element 32 is in the form of a piston which is connected to the second portion 16b of the seat element 16 and is displaceable in a cylinder 34 between a holding position and a release position. In particular, a free end of a piston rod 36 of the holding element 32 in the form of a piston is connected to the second portion 16b of the seat element 16. The cylinder 34, on the other hand, is in the form of a hydraulic cylinder 34 and comprises a fluid chamber 40 which is delimited by a piston surface 38 of the holding element 32 in the form of a piston and contains a hydraulic fluid.

As long as fluid is able to flow unhindered into the fluid chamber 40 and out of the fluid chamber 40, the holding element 32, as shown in FIG. 4, is freely displaceable in the cylinder 34. Accordingly, the second portion 16b of the seat element 16 is then also freely movable between its rest position and its use position. If, on the other hand, as illustrated in FIG. 5, the flow of fluid out of the fluid chamber 40 is interrupted, displacement of the holding element 32 in the form a piston in the cylinder 34 in the direction towards the fluid chamber 40 is no longer possible. The holding element 32 thus holds the second portion 16b of the seat element 16 in its use position against the spring force applied by the biasing mechanism 22 to the second portion 16b of the seat element 16 and also against any additional force which is applied to the second portion 16b of the seat element 16, for example by a passenger seated on the passenger seat 10. Accordingly, the holding element 32 in the form of a piston is then able to lock the second portion 16b of the seat element 16 in its use position.

The fluid chamber 40 is connected by a first hydraulic line 42 to a region 44 of the cylinder 34 that is remote from the piston surface 38 of the holding element 32 in the form of a piston. As long as fluid is able to flow unhindered through the first hydraulic line 42, fluid is able to flow unhindered into the fluid chamber 40 and out of the fluid chamber 40 and the holding element 32 is freely displaceable in the cylinder 34. Accordingly, the second portion 16b of the seat element 16 is then also freely movable between its rest position and its use position. An equalizing container 45 connected to the first hydraulic line 42 serves to equalize temperature and pressure fluctuations.

The locking mechanism 24 further comprises a first valve 46 arranged in the first hydraulic line 42, which first valve is adjustable between an open position shown in FIG. 4, in which the first valve 46 allows the holding element 32 to move from its holding position into its release position, and a closed position illustrated in FIG. 5, in which the first valve 46 prevents the holding element 32 from moving from its holding position into its release position. By closing the first valve 46, the flow of fluid through the first hydraulic line 42 can be interrupted, so that the flow of fluid out of the fluid chamber 40 of the cylinder 34 is prevented and a displacement of a holding element 32 in the form of a piston in the direction towards the fluid chamber 40, that is to say a movement of the holding element 32 from its holding position into its release position, is prevented.

The first valve 46 is biased into the open position. Furthermore, the first valve 46 is equipped with an actuating element 48 which can be activated by the action on the seat element 16 of a weight force FG of a user seated on the passenger seat 10, in order to move the first valve 46 into its closed position. The actuating element 48 is biased into a non-activated state. It is thereby ensured that the first valve 46 remains in its open position shown in FIG. 4 as long as no weight force FG is acting on the seat element 16, that is to say, no user is seated on the passenger seat 10. If, on the other hand, the actuating element 48 is activated against the biasing force acting on the actuating element 48 by the weight force FG of a user seated on the passenger seat 10, the first valve 46 is moved into its closed position illustrated in FIG. 5 without requiring further manual actuation on the part of the user.

In order to allow the weight force FG of a user seated on the passenger seat 10 to be converted into an activation of the actuating element 48 and consequently into a movement of the first valve 46 into its closed position, the actuating element 48, which is here in the form of an actuating pin, is connected to the seat element carrier 12 which carries the seat element 16 and consequently is loaded with a weight force FG acting on the seat element 16. As soon as the seat element 16 is loaded with the weight force FG of a user of the passenger seat 10, the actuating element 48 is pushed into its activated position and the first valve 46 is closed.

The locking mechanism 24 further comprises a non-return valve 50 which allows the holding element 32 to move from its release position into its holding position but prevents the holding element 32 from moving from its holding position into its release position. The non-return valve 50 is arranged in a second hydraulic line 52 running parallel to the first hydraulic line 42 and allows fluid to flow from the region 44 of the cylinder 34 that is remote from the piston surface 38 of the holding element 32 in the form of a piston into the fluid chamber 40 formed in the cylinder 34. By contrast, however, the non-return valve 50 prevents fluid from flowing out of the fluid chamber 40 into the region 44 of the cylinder 34 that is remote from the piston surface 38.

By equipping the locking mechanism 24 with the second hydraulic line 52 and the non-return valve 50, a displacement of the holding element 32 in the form of a piston in the cylinder 34 towards the fluid chamber 40 is possible even when a weight force FG of a user seated on the passenger seat 10 is acting on the seat element 16 and consequently the first valve 46 arranged in the first hydraulic line 42 is closed. Accordingly, the second portion 16b of the seat element 16 can be pivoted from its rest position into its use position by the already seated user, but a return movement of the second portion 16b of the seat element 16 from its use position into its rest position is no longer possible because the non-return valve 50 prevents fluid from flowing back out of the fluid chamber 40 into the region 44 of the cylinder 34 that is remote from the piston surface 38.

The unlocking mechanism 26 of the passenger seat 10 comprises a second valve 54 which is adjustable between a closed position illustrated in FIGS. 4 and 5, in which the second valve 54 prevents the holding element 32 in the form of a piston from moving from its holding position into its release position, and an open position shown in FIG. 6, in which the second valve 54 allows the holding element 32 to move from its holding position into its release position. In particular, the second valve 54 is transferred from its closed position into its open position by operation of the activating switch 28 of the unlocking mechanism 26 and remains in the open position as long as the activating switch 28 is operated by a user of the passenger seat 10.

The second valve 54 is arranged in a third hydraulic line 56 which, parallel to the first and second lines 42, 52, connects the fluid chamber 40 of the cylinder 34 to the region 44 of the cylinder 34 that is remote from the piston surface 38 of the holding element 32 in the form of a piston. Furthermore, the second valve 54 is biased into its closed position. By opening the second valve 54, fluid is allowed to flow through the third hydraulic line 56 so that the holding element 32 in the form of a piston can be moved in the cylinder 34 in the direction towards the fluid chamber 40 even when the flow of fluid through the first hydraulic line 42 is prevented by the closed first valve 46 and the flow of fluid through the second hydraulic line 52 is prevented by the non-return valve 50. Consequently, a pivoting movement of the second portion 16b of the seat element 16 from its use position in the direction towards its rest position by a user seated on the passenger seat 10 is possible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat comprising:
a backrest,
a seat element which comprises a first portion adjoining the backrest and a second portion which is pivotable relative to the first portion between a rest position and a use position, wherein the second portion of the seat element in the use position increases a depth of a seat surface of the seat element that can be used by a user, and
a locking mechanism which is configured to prevent a pivoting movement of the second portion of the seat element from the use position into the rest position when a weight force of a user seated on the passenger seat is acting on the seat element,
wherein the locking mechanism comprises a holding element connected to the second portion of the seat element, which holding element is movable between a holding position, in which the holding element holds the second portion of the seat element in the use position, and a release position, in which the holding element permits the pivoting movement of the second portion of the seat element from the use position into the rest position.

2. The passenger seat as claimed in claim 1, wherein the locking mechanism is configured to release the second portion of the seat element for the pivoting movement from the use position into the rest position when the weight force acting on the seat element is removed.

3. The passenger seat as claimed in claim 1, wherein the second portion of the seat element is pivotable about a pivot axis, which is arranged in a region of a front edge, remote from the backrest, of the first portion of the seat element, relative to the first portion of the seat element between the rest position, in which a lower side, remote from a seat surface portion of the second portion of the seat element, of the second portion of the seat element forms an angle of from 45 to 135°, with a lower side, remote from a seat surface portion of the first portion of the seat element, of the first portion of the seat element, and the use position, in which the seat surface portion of the second portion of the seat element forms an angle of from 170 to 225°, with the seat surface portion of the first portion of the seat element.

4. The passenger seat as claimed in claim 1, wherein the second portion of the seat element is pivotable from the rest position into the use position by manual actuation.

5. The passenger seat as claimed in claim 1, which further comprises a biasing mechanism which is configured to bias the second portion of the seat element into the rest position.

6. The passenger seat as claimed in claim 1, wherein the holding element comprises a piston which is connected to the second portion of the seat element and is displaceable in a cylinder between the holding position and the release position.

7. The passenger seat as claimed in claim 1, wherein the locking mechanism comprises a first valve which is adjustable between an open position, in which the first valve allows the holding element to move from the holding position into the release position, and a closed position, in which the first valve prevents the holding element from moving from the holding position into the release position.

8. The passenger seat as claimed in claim 7, wherein the first valve comprises an actuating element which is configured to be activated by an action on the seat element of the weight force of the user seated on the passenger seat, to move the first valve into the closed position, wherein the actuating element is at least one of connected to a seat element carrier or connected to the first portion of the seat element or biased into a non-activated state.

9. The passenger seat as claimed in claim 7, wherein the locking mechanism comprises a non-return valve which allows the holding element to move from the release position into the holding position but prevents the holding element from moving from the holding position into the release position.

10. The passenger seat as claimed in claim 1, which further comprises an unlocking mechanism which is configured to permit the pivoting movement of the second portion of the seat element from the use position into the rest position even though the weight force of the user seated on the passenger seat is acting on the seat element.

11. The passenger seat as claimed in claim 10, wherein the unlocking mechanism comprises a manually operable activating switch and is at least one of biased into a non-activated position or configured to permit the pivoting movement of the second portion of the seat element from the use position into the rest position only when the activating switch is operated, wherein the activating switch is arranged in a region of an armrest of the passenger seat.

12. The passenger seat as claimed in claim 1,
which further comprises an unlocking mechanism which is configured to permit the pivoting movement of the second portion of the seat element from the use position into the rest position even though the weight force of the user seated on the passenger seat is acting on the seat element, and
wherein the unlocking mechanism comprises a second valve which is adjustable between a closed position, in which the second valve prevents the holding element from moving from the holding position into the release position, and an open position, in which the second valve allows the holding element to move from the holding position into the release position.

13. The passenger seat as claimed in claim 9, which further comprises an unlocking mechanism which is configured to permit the pivoting movement of the second portion of the seat element from the use position into the rest position even though the weight force of the user seated on the passenger seat is acting on the seat element,
wherein the unlocking mechanism comprises a second valve which is adjustable between a closed position, in which the second valve prevents the holding element from moving from the holding position into the release position, and an open position, in which the second valve allows the holding element to move from the holding position into the release position, and
wherein a flow cross-section of at least one of the first valve or the non-return valve is larger than a flow cross-section of the second valve.

14. The passenger seat as claimed in claim 7, which further comprises an unlocking mechanism which is configured to permit the pivoting movement of the second portion of the seat element from the use position into the rest position even though the weight force of the user seated on the passenger seat is acting on the seat element,
wherein the unlocking mechanism comprises a second valve which is adjustable between the closed position, in which the second valve prevents the holding element from moving from the holding position into the release position, and the open position, in which the second valve allows the holding element to move from the holding position into the release position, and
wherein a flow cross-section of at least one of a first line, in which the first valve is arranged, a second line, in which the non-return valve is arranged, is larger than a flow cross-section of a third line in which the second valve is arranged.

15. A passenger cabin area which comprises:
a main aisle which extends substantially parallel to a longitudinal axis of the passenger cabin area,
a transverse aisle which branches from the main aisle, and
at least one passenger seat as claimed in claim 1 which is arranged in the passenger cabin area adjoining the transverse aisle in such a manner that the seat element of the passenger seat is facing the transverse aisle.

* * * * *